US011025099B2

(12) United States Patent
Mese et al.

(10) Patent No.: US 11,025,099 B2
(45) Date of Patent: Jun. 1, 2021

(54) MULTIPOINT WIRELESS POWER TRANSFER SYSTEM AND METHOD

(71) Applicant: AVAGO TECHNOLOGIES INTERNATIONAL SALES PTE. LIMITED, Singapore (SG)

(72) Inventors: Murat Mese, Rancho Palos Verdes, CA (US); John Walley, Ladera Ranch, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 183 days.

(21) Appl. No.: 16/000,450

(22) Filed: Jun. 5, 2018

(65) Prior Publication Data

US 2019/0372402 A1 Dec. 5, 2019

(51) Int. Cl.
| | |
|---|---|
| *H02J 50/60* | (2016.01) |
| *H02J 5/00* | (2016.01) |
| *H02J 50/12* | (2016.01) |
| *H02J 7/02* | (2016.01) |
| *H02J 50/80* | (2016.01) |
| *H02J 50/50* | (2016.01) |
| *H02J 50/30* | (2016.01) |
| *H02J 50/20* | (2016.01) |

(52) U.S. Cl.
CPC .............. *H02J 50/60* (2016.02); *H02J 5/005* (2013.01); *H02J 7/025* (2013.01); *H02J 50/12* (2016.02); *H02J 50/20* (2016.02); *H02J 50/30* (2016.02); *H02J 50/50* (2016.02); *H02J 50/80* (2016.02)

(58) Field of Classification Search
CPC .. H02J 50/12; H02J 50/10; H02J 50/20; H02J 50/50; H02J 50/30; H02J 50/80; H02J 50/90; H02J 5/005; H02J 7/00; H02J 7/025; H02J 7/02; H02J 7/04; H02J 17/00; H04B 5/00; H04B 5/0047; H04B 84/12
USPC .......................................................... 307/104
See application file for complete search history.

(56) References Cited

U.S. PATENT DOCUMENTS

| | | | | |
|---|---|---|---|---|
| 9,787,103 | B1* | 10/2017 | Leabman | H04W 12/06 |
| 9,825,674 | B1* | 11/2017 | Leabman | H02J 50/20 |
| 9,853,458 | B1* | 12/2017 | Bell | H02J 50/90 |
| 10,230,266 | B1* | 3/2019 | Leabman | H02J 7/025 |
| 10,263,432 | B1* | 4/2019 | Leabman | H02J 50/20 |
| 10,291,055 | B1* | 5/2019 | Bell | H02J 50/27 |

(Continued)

*Primary Examiner* — Nguyen Tran
*Assistant Examiner* — Jagdeep S Dhillon
(74) *Attorney, Agent, or Firm* — Morgan, Lewis & Bockius LLP

(57) ABSTRACT

A system, an apparatus, and a method for wireless power transfer are provided. The system includes a plurality of wireless power transmitters and at least one receiver. The at least one receiver is configured to receive the power wirelessly transmitted at least one wireless power transmitter of the plurality of wireless power transmitters. The plurality of wireless transmitters is configured to wirelessly transmit power. Each wireless power transmitter is positioned at a different location and/or orientation. Each wireless power transmitter is an active power source or a passive relay power source. The one or more wireless power transmitters are identified for power transmission based on a plurality of factors including at least presence of obstacles in transmission paths.

19 Claims, 6 Drawing Sheets

(56) References Cited

U.S. PATENT DOCUMENTS

| | | | |
|---|---|---|---|
| 2013/0049484 A1* | 2/2013 | Weissentern | H02J 5/005 |
| | | | 307/104 |
| 2013/0300205 A1* | 11/2013 | Tzanidis | H02J 7/025 |
| | | | 307/104 |
| 2015/0004956 A1* | 1/2015 | Aksamit | H04W 4/025 |
| | | | 455/418 |
| 2015/0008736 A1 | 1/2015 | Uchida et al. | |
| 2015/0236526 A1* | 8/2015 | Jadidian | H02J 50/12 |
| | | | 320/108 |
| 2015/0340875 A1* | 11/2015 | Prasad | H02J 50/30 |
| | | | 307/104 |
| 2016/0099757 A1* | 4/2016 | Leabman | H02J 50/23 |
| | | | 307/104 |
| 2016/0190855 A1* | 6/2016 | Katabi | H02J 50/12 |
| | | | 320/108 |
| 2016/0191121 A1* | 6/2016 | Bell | H02J 7/00045 |
| | | | 307/104 |
| 2017/0005531 A1 | 1/2017 | Zeine et al. | |
| 2017/0077764 A1 | 3/2017 | Bell et al. | |
| 2018/0323637 A1* | 11/2018 | Katabi | H04B 5/0037 |

* cited by examiner

MULTIPOINT WIRELESS POWER TRANSFER SYSTEM AND METHOD

BACKGROUND

The use of electronic devices continues to expand into all aspects of daily life. Wireless charging can be used to charge various electronic devices. Wireless charging is the technique of wirelessly supplying power to the electronic devices rather than using a power line. Wireless charging provides a convenient charging method when a power outlet is not available/preferred.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

According to one or more aspects of the disclosed subject matter, a system for wireless power transfer includes a plurality of wireless power transmitters and at least one receiver. The plurality of wireless power transmitters is configured to wirelessly transmit power. The at least one receiver is configured to receive the power wirelessly transmitted from at least one wireless power transmitter of the plurality of wireless power transmitters. Each wireless power transmitter is positioned at a different location and/or orientation. Each wireless power transmitter is an active power source or a passive relay power source. The one or more wireless power transmitters are identified for power transmission based on a plurality of factors including at least presence of obstacles in transmission paths.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
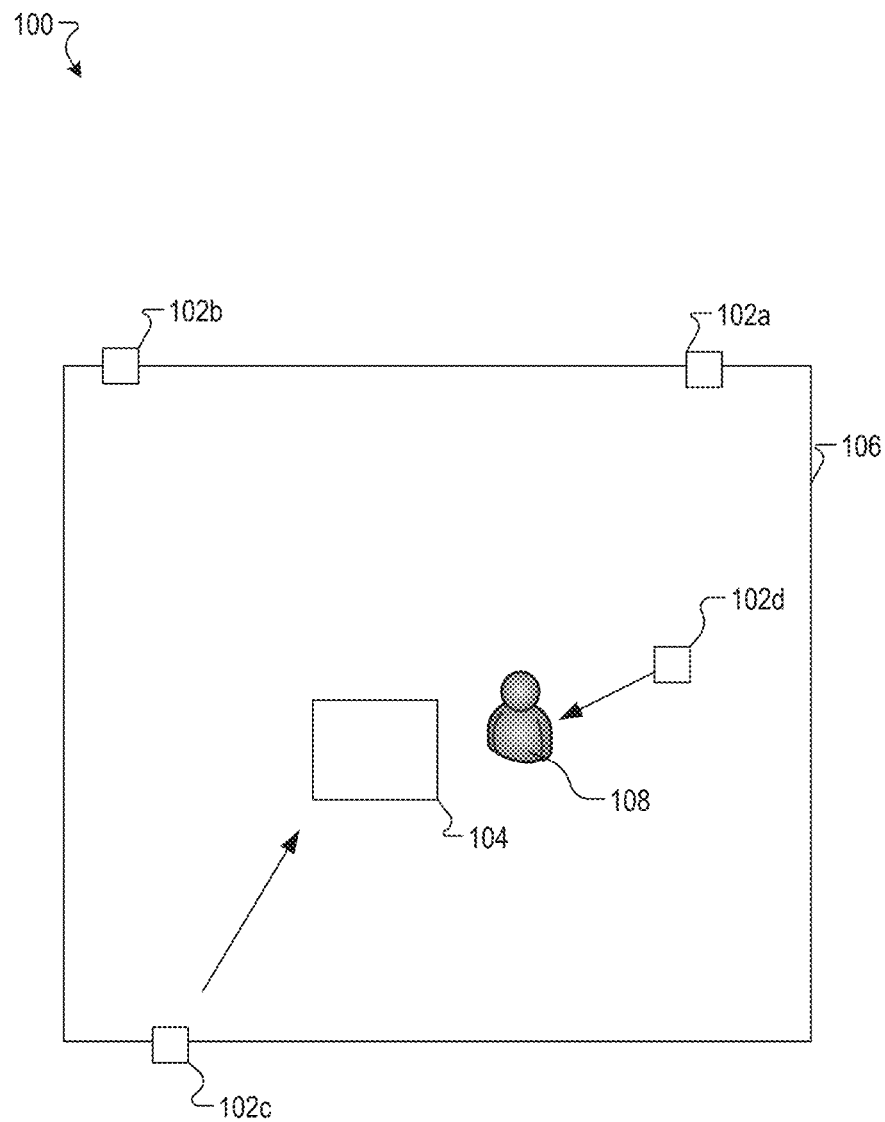
FIG. 1 is a schematic of a wireless charging system according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a multipoint wireless power transfer system and associated methodology.

Generally, a system for wireless power transfer may include a plurality of wireless power transmitters. Receivers may receive power from one or more of the plurality of wireless power transmitters.

The wireless charging system provides several advantages. For example, as further described herein, the system may optimize the power based on a plurality of factors. The system increases safety for living being (i.e., humans, pets, etc.) and increases the power transfer efficiency.

Power may be distributed in a plurality of ways. For example, point-to-point or point-to-multipoint configurations may be used. Radio frequency (RF), light, or acoustic power transfer may use point to point or point to multipoint configuration. Described herein are a method and a system that use distributed power delivery. Distributed power delivery provides several advantages. Safety for humans near transmitters is improved as the power is distributed. In addition, power transfer efficiency is not affected when individuals are in the path of the power transfers as the power transfer is not blocked. In addition, efficiency of the system may be improved by selectively activating/deactivating transmitters that are proximate to the device. Additional transmitters may be activated on as needed basis.

FIG. 1 is a schematic of a wireless charging system 100 according to one example. The wireless charging system 100 includes one or more wireless power transmitters (WPTs) and a power harvester device 104 positioned in a predefined area 106 (e.g., room in a house). Each of the WPT 102a-d may be configured to transmit, receive, or transmit and receive power. The WPT 102*a*-*d* may transmit power to the power harvest device 104 and/or to other WPTs 102*a*-*d*.

The wireless charging system may be implemented in a house or an industrial building. The WPT 102 may be light bulbs, or may be located within proximity to wall switches, alternating current (AC) plug outlets, televisions, smoke alarms, and the like. The wireless power transmitters may also be passive relays such as a tile surface, a painting on the wall, a mouse pad, and the like. The passive relay may be part of furniture, tiles, lamps, and the like. The passive relay may have no primary power source (i.e., not directly coupled to a power source). The relay device may receive power from transmitters and relay the power to other devices (e.g., power harvester device 104). The WPT 102 transmits one or more forms of power. The one or more forms include laser, light, radio frequency (RF), induction, inductive resonance, audio, and the like as would be understood by one of ordinary skill in the art. Microwave transmission of power includes transmitting power by emitting super-high-frequency electromagnetic waves such as microwaves via an antenna. Magnetic induction uses magnetic inductive coupling between adjacent coils. Magnetic resonance transmits non-radial magnetic field energy between two resonators. Exemplary input/output forms of power are shown in FIG. 2B.

The power harvester device 104 may be one or more power harvester devices positioned at different location in the predefined area 106. The power harvester device 104 may be a wireless charging capable device (WCD). The WCD may be an electronic device. The electronic device may be a mobile device (such as a mobile phone, a smart phone, a laptop computer, a digital broadcasting terminal, a personal digital assistant (PDA), a portable multimedia player (PMP), or a navigation device) or an electronic device (such as a wall-mounted television (TV), a desk lamp, an electronic picture frame, a vacuum cleaner, and the like).

Each WPT 102 may be selectively activated based on the presence of an obstruction (e.g., human) in a transmission path between the WPT 102 and the power harvester device 104 and based on safety power levels. Additional WPTs may be added to the system 100 based on power availability. For example, additional WPTs may be activated to get more power delivered.

In one implementation, WPTs 102 may include proximity sensors. In other implementation, the proximity sensors may be separate from the WPTs 102. The proximity sensors may communicate with the WPT 102 via a control channel. The control channel may have security and authentication procedures so only allowed devices at allowed times can be part of the system 100. The proximity sensors may determine the location of electronic devices and/or a location of a living being (e.g., a human, an animal) moving in the predefined area 106. The location of the power harvester devices 104 (e.g., electronic devices) and/or the location of individuals in the predefined area 106 may be used to determine which WPTs are activated. Even if a WPT is the closest to the power harvester device, if there is a human or any living being in between, the WPT does not transmit power. For example, the WPT 102*d* in FIG. 1 stops transmitting power to the power harvester device 104 in response to detecting a user 108 in the transmission path. The WPT 102*c* starts or continues to transmit power to the power harvester device 104. The WPT 102*c* may also increase the level of power transmitted to the power harvester device 104 once the WPT 102*d* stop transmitting. The WPT 102*d* may resume transmitting in response to determining that the user 108 is no longer in the path between the WPT 102*d* and the power harvester device 104. WPT 102*d* may communicate directly with the WPT 102*c* to transmit information associated with the operation status of WPT 102*d* or via a master device as described later herein.

The location of an electronic device having a dead battery may not be determined using communication techniques. Using the proximity detector/sensor, the WPTs 102 in the proximity of the electronic device may be activated based on their respective power levels. Once the battery of the electronic device is charged (i.e., state of charge of the battery reaches a predetermined level), two-way communication with the WPTs 102 may be exchanged to determine the location of the electronic device. The WPTs 102 may also determine how much power to deliver.

The proximity sensors may determine the location of a device or obstacle based on ultrasonic pinging or RF turn-around time. The proximity may also be determined based on RF reflection, ultrasonic reflection, or light reflection (e.g., infrared detectors). The proximity may also be detected using a camera in the predefined area 106. The camera may be coupled to the master device. In one example, the camera may transmit proximity information to the WPT 102*a*-*d*. The camera may be an acoustic camera. Other sensors, such as sensors that detect heat, motion, pressure, air movement, and the like, can also be used as one of ordinary skill would recognize.

Further, the WPT 102 may include a communication module that support any wireless communication link such as a Bluetooth, Bluetooth LE, WiFi, ZigBee, or near field communication (NFC) mediated link. The WPT 102 may communicate with each other to determine the location of other WPTs, self-configure, and map out the room or a predefined zone.

In one implementation, the wireless charging system 100 may include a master device configured to control the WPTs 102. The master device may communicate with the WPTs and sensors via the control channel. In one implementation, the system 100 may have a mesh topology. However, other topologies are also possible without departing from the scope of the present disclosure.

During an RF power transfer, the power transferred is inversely proportional to the square of the distance. In one implementation, when two or more devices are in the room or in the predefined area 106, the propagation path of the power delivery is optimized to minimize the sum over squared distance.

As described previously herein, the power harvester device 104 may receive from a subset of WPTs 102*a*-*d*. For example, if a WPT is transmitting light and the path to the WCD is obstructed, the WPT may be deactivated. In one example, WPTs that are able to deliver power with efficiency higher than a predetermined efficiency are activated. In one implementation, the master device may identify the WPTs and activate the WPT by transmitting control signal to the WPTs. The master device may also communicate transmission parameters (e.g., beam characteristic, frequency) and a target device to the WPT. The target device may be identified from the power harvester devices available in the predefined area 106 based on a plurality of factors. The plurality of factors may include a status of charge of the electronic devices (i.e., power harvester devices), a priority level associated with the electronic device, and the like. For example, in response to determining that multiple power harvester devices 104 are in the predefined area 106 (e.g., room), the status of charge of each of the electronic devices may be retrieved. The electronic device having the lowest status of charge (e.g., dead battery) may be selected as the target device. Then, the WPTs 102a-d (or a subset of WPTs 102a-d) may transfer the power to the target device. A priority level may be associated with the electronic device. For example, electronic devices associated with parents may be given priority over electronic devices associated with children. The electronic device associated with the parent may be selected as the target device. Thus, the electronic device associated with the parents may be charged before other devices.

The target device may also be identified based on the time of the day and date. For example, extra power may be delivered at a specific time to a specific device. For example, when the user 108 is scheduled to leave the predefined area 106 (e.g., home, office) at 8 AM, power from all available WPTs 102a-d may be transmitted to the one or more electronic devices associated with the user 108. The target device may be also identified based on the priority level. The priority level may be based on the status of user, status of the battery, payments, and the like.

In one implementation, the WPT 102 may transmit information associated with the wireless power charging to the power harvester device 104 such an electronic device. The WPT 102 may send a signal to the electronic device that causes a message to display on the electronic device. The message may include instructions or status information. For example, the message may be "Move the phone in this direction to charge faster" or "Move the phone to the side table to increase your charging speed by 20%." In addition, the information may include an optimal direction of the power harvester device 104 to optimize power transfer. As can be appreciated, the instructions and information may also be displayed on other devices, such as a television in the room. The instructions and information may also be conveyed via sound, such as with a synthesized voice that emanates from the device, or any other device that is present. How the instructions and information is displayed and/or otherwise conveyed may also be configurable.

In one implementation, the power harvester device 104 (e.g., mobile device) may act as a dynamic WPT. For example, the power harvester device 104 may transmit power received from different sources (e.g., WPT). The power harvester device 104 may transmit RF power when placed on an inductive pad. The power harvester device 104 may also transmit power from the battery (e.g., when the battery is above a predetermined threshold). Thus, the power harvester device 104 may act as a wireless charging relay for other accessories (e.g., headphone, wearable devices such as watches, necklaces, rings).

Thus, the system 100 may be formed temporarily of WCDs or power harvester devices 104 (i.e., in a point-to-point or multipoint-to-point configuration). The WCDs may have a mesh topology. The WCD may act as a WPT for a defined period of time. For example, if the WCD is not able to connect to another device due to a low battery of the other device. The WCD may transmit power for the defined period of time (e.g., 30 seconds) to energize the other device. The WCD may scan the predefined area 106 to determine whether any sensor or device needs power. The WCD may transmit power and receive the desired information from the WCD. The WCD may activate passive sensors and provide power to obtain the information. Then, the WCD may stop power transmission and the passive sensor may go back to sleep mode.

Figure 2A:
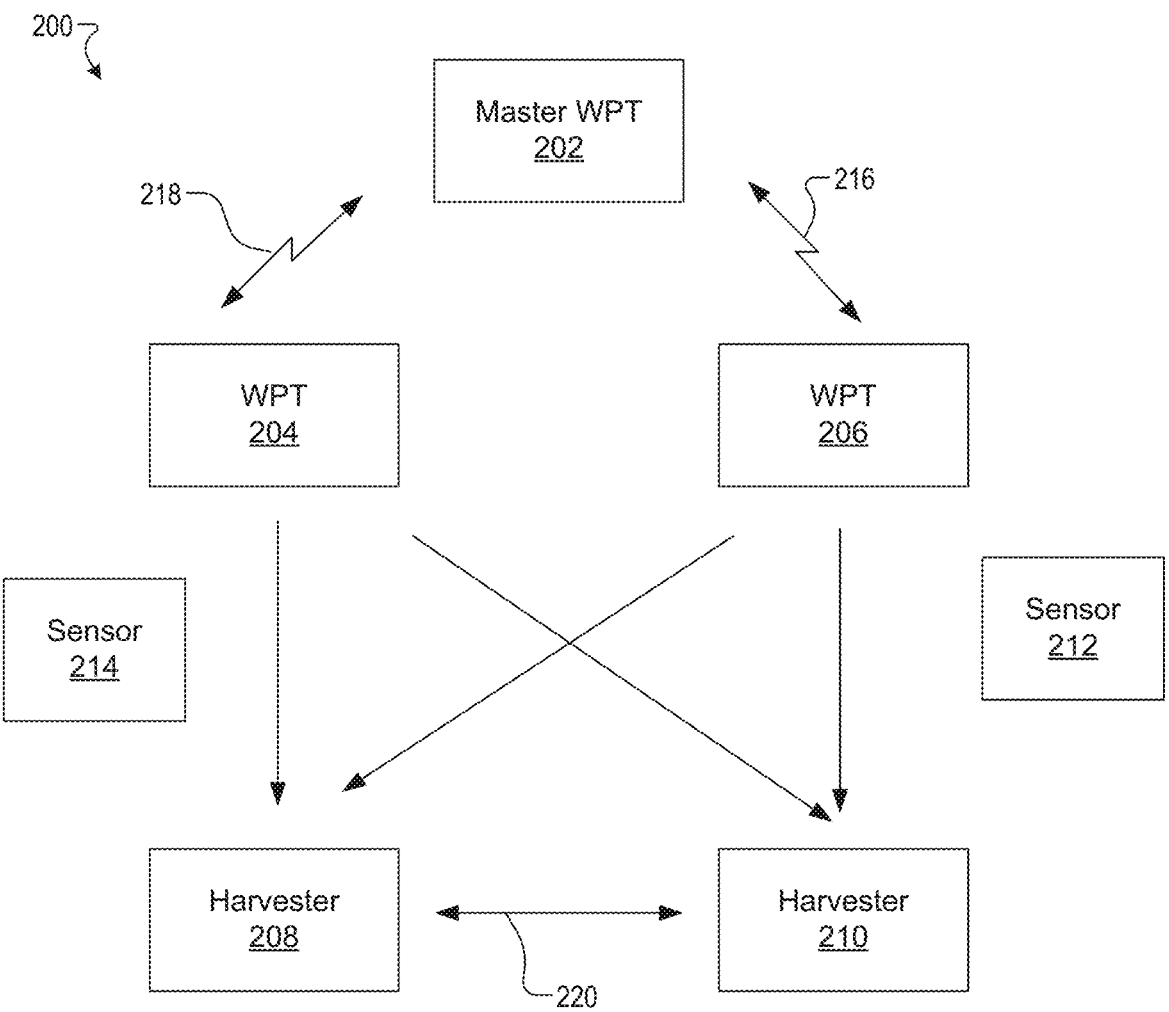
FIG. 2A is a schematic of the wireless charging system including a master wireless power transmitter according to one example.
Figure 2B:
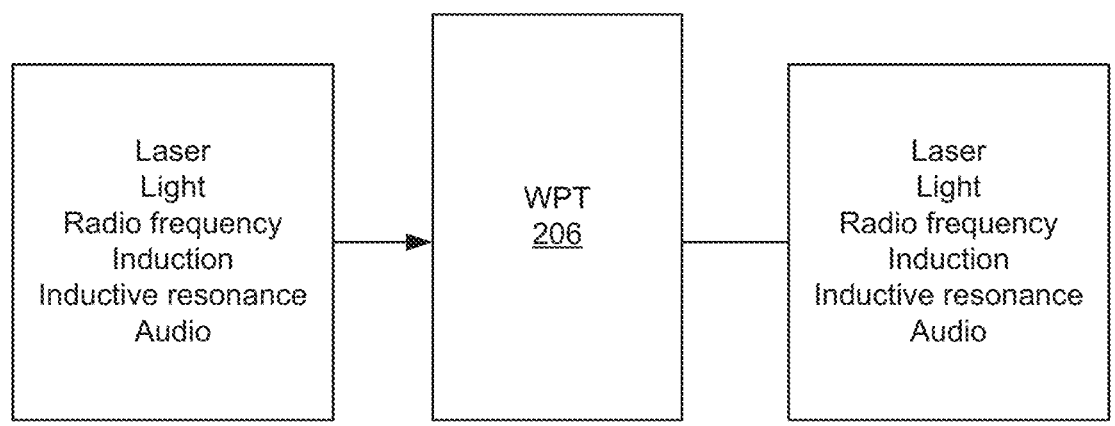
FIG. 2B is a schematic that shows a plurality of energy forms according to one example.

FIG. 2A is a schematic of the wireless charging system including a master wireless power transmitter according to one example. In one implementation, the system 200 includes a master WPT 202, a first WPT 204, a second WPT 206, a first harvester 208 (i.e., receiver), a second harvester 210, a first sensor 212, and a second sensor 214. The first harvester 208 receives power from the closest WPT transmitter (e.g., the WPT transmitter 204). The first harvester 208 also receives power from the second WPT 206 and/or the second harvester 210. The WPT master 202 identifies the WPTs that transmit power to the first harvester 208. The WPT master 202 communicates with the first WPT transmitter 204 and the second WPT transmitter 206 via control channels 218, 216 respectively. In other implementations, the system may include additional master WPTs. For example, each WPTs may be configured to control a predetermined number of WPTs.

The first sensor 212 and the second sensor 214 are configured to detect living being and to transmit their position and the location of the detected living being to the WPT master 202. The WPT master 202 may also transmit to the WPTs control parameters (e.g., power level, frequency, duration, and schedule). The WPTs transmit power to the target device using the control parameters.

In one implementation, the first WPT 204 and the second WPT 206 may use the same frequency to transmit the power. In other implementations, the first WPT 204 and the second WPT 206 may use different frequencies to transmit the power to the harvester. When the first WPT 204 and the second WPT 206 are using different frequencies, the frequency of each WPT may be selected such as to minimize beating. Beating may occur if both the first WPT 204 and the second WPT 206 are using very close frequencies which may lower the efficiency of power transfer.

As described previously herein, the harvesters 208, 210 may act as relay to charge other harvesters. For example, the second harvester 210 may transmit power to the first harvester 208 via link 220. The harvesters may select to receive or transmit power based on a plurality of factors. The plurality of factors may include price of the source, safety of the source, and the like as described previously herein.

The WPT may continuously transmit power with different amplitudes or the WPT may transmit power in small burst (e.g., 10 W). The harvesters may include one or more antennas to receive the power. The harvester may activate/deactivate different antennas to receive power and adjust the parameters of the power reception.

In one implementation, the WCD such as a cellphone may detect power transmission in the predefined area 106 (e.g., in a room). The WCD detects RF carriers/power. The cellphone transmits a message to the system 100 requesting to modify the signal due to interference, low/high power level, or the like. The WCD may or may not be currently receiving power from any of the WPTs 102 of the system 100. The system 100 (e.g., via the master WPT 202) may adjust the frequencies and/or power levels of the WPTs. The WPT master 202 may also deactivate the WPT adjacent to the cellphone. The cellphone may communicate with the WPT master via Bluetooth, Bluetooth LE, WiFi, ZigBee, or near field communication (NFC) mediated link. In one implementation, the cellphone may be a non-wireless charging capable device.

The cellphone or other device may include an envelope detector (e.g., broadband envelope detector or narrowband envelope detector). The envelope detector may detect energy above a predetermined level (e.g., above −20 dBm). The predetermined level may be based on the type of power being transmitted/received. The envelope detector then may send a message to the system 100 or the WPT master 202 to lower the power. This provides the advantage of increasing safety for humans and animals present in the predefined area 106.

Figure 3A:
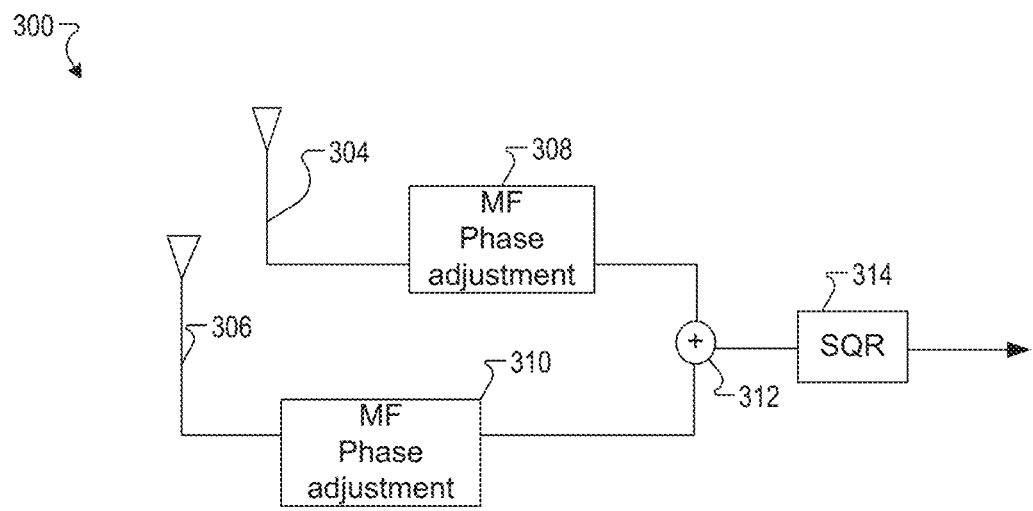
FIG. 3A is a block diagram of a coherent transmitter according to one example.

FIG. 3A is a block diagram of a coherent transmitter 300 according to one example. The coherent transmitter 300 (also harvester, combiner) may include a first antenna 304 that receives/transmits at a first frequency, a second antenna 306 that receives/transmits at a second frequency, a first matched filter (MF) 308, a second matched filter (MF) 310, an adder 312, and block 314. Block (SQR) 314 performs a square operation. In coherent transmission, the phases are aligned. A closed loop control may be used at the transmitter to control the phase. The transmitter is capable of determining the appropriate phases for delivering coherent signals. At the receiver, circuitry may be used to adjust a receiver phase delay prior to power combining.

Figure 3B:
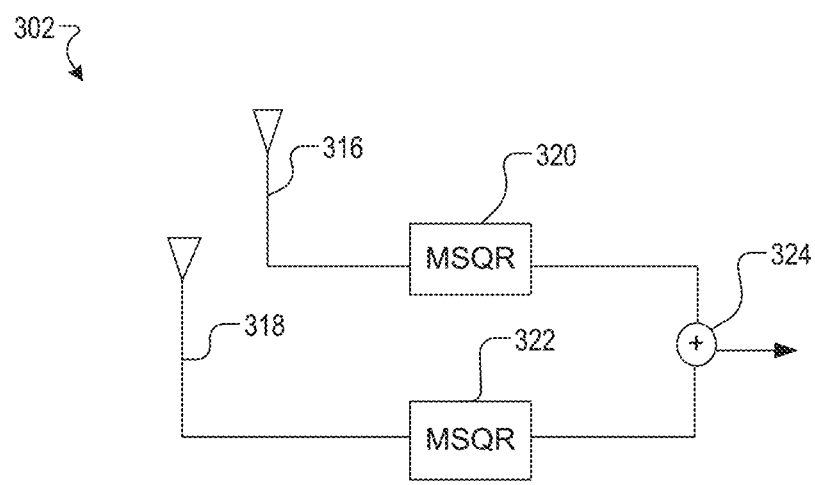
FIG. 3B is a block diagram of a non-coherent transmitter according to one example.

FIG. 3B is a block diagram of a non-coherent transmitter 302 according to one example. The coherent transmitter 302 (also harvester, combiner) may include a first antenna 316 that receives/transmits at a first frequency, a second antenna 318 that receives/transmits at a second frequency, a first block (MSQR) 320 (magnitude square), a second block (MSQR) 322, and an adder 324. Blocks 320 and 322 determine the intensity of the received/transmitted signal.

The system or the master WPT (e.g., master WPT 202 of FIG. 2) may identify which devices receive coherent or non-coherent transmission. The WPT may use different frequencies based upon multiple criteria such as interference, specific absorption rate (SAR), and the like. A WCD may receive power via various charging paths that combine coherent and non-coherent transmitters.

Figure 4:
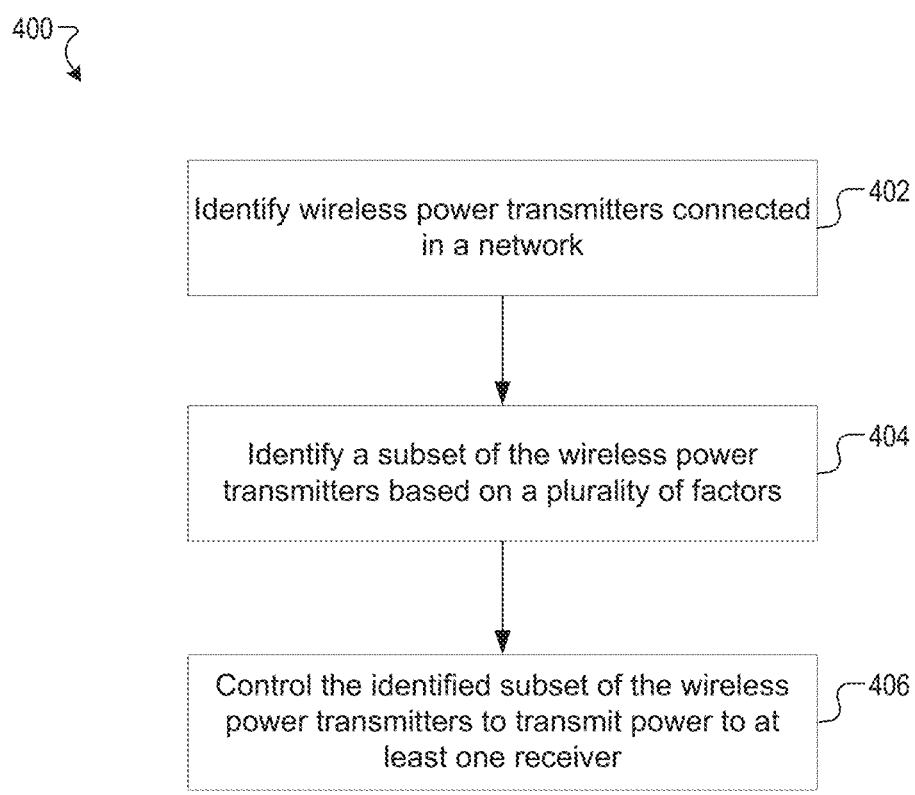
FIG. 4 is a flowchart for a wireless charging process according to one example.

FIG. 4 is a flowchart for a wireless charging process according to one example. Certain details and features have been left out of flowchart 400 that are apparent to a person of ordinary skill in the art. For example, a step may include one or more substeps or may involve specialized equipment or materials, as known in the art.

At step 402, the wireless power transmitter identifies other wireless power transmitters connected via a network. In one implementation, the master wireless power transmitter may identify the WPTs. In one implementation, each WPT may broadcast transmission/position information through the predefined zone 106 and each WPT may receive the transmitted information from all WPTs.

At step 404, a subset of the WPTs is identified based on a plurality of factors. The plurality of factors may include each WPT proximity to at least one receiver, presence of one or more living being in the power transmission path between each WPT and the receiver, configuration and capabilities of each WPT, and the like. The master WPT may identify the subset of WPTs. In other implementations, each WPT may determine whether to transmit based on the plurality of factors and the information received from other WPTs.

At step 406, each WPT included in the subset of the wireless power transmitters may transmit power to the at least one receiver.

Figure 5:
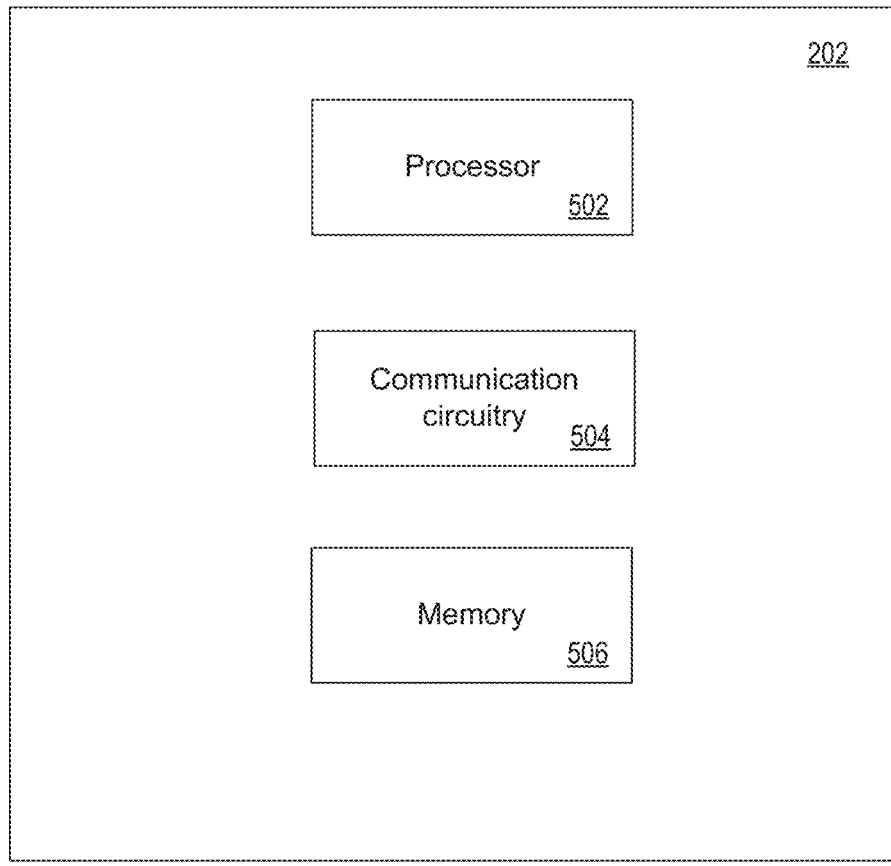
FIG. 5 is a block diagram of the master wireless power transmitter according to one example.

FIG. 5 is a block of the master wireless power transmitter 202 according to one example. The master WPT 202 may include a processor 502, communication circuitry 504, and a memory 506. The processor 502 (or a microprocessor) may control and manage a plurality of WPTs as described previously herein. The processor 502 may implement process 400 of FIG. 4. The processor 502 may be an integrated circuit that includes logic gates, circuitry, and interfaces that are configured to execute the processes described herein. The processor 502 may comprise a number of processor technologies known in the art. Non-limiting examples of the processor include, but are not limited to, an x86 processor, an ARM processor, a reduced instruction set computing (RISC) processor, an application-specific integrated circuit (ASIC), a complex instruction set computing (CISC) processor, a field programmable gate array (FPGA), and the like. The memory 506 is a non-volatile storage device for storing data and instructions, to be used by the processor 502. The memory 506 may predetermined maximum power levels and the like. Non-limiting examples of the memory 506 may include, but are not limited to, a random access memory (RAM), a read only memory (ROM), a hard disk drive (HDD), a secure digital (SD) card, and the like.

The communication circuitry 504 may effectuate wired and/or wireless communications to and from the WPTs, sensors, and WCDs. The communication circuitry 504 may operate based on any number of communication protocols, such as Bluetooth®, Wireless Fidelity (WiFi), Near-Field communications (NFC), ZigBee, and others. The communication circuitry 504 is not limited to radio frequency based technologies, but may include radar, infrared waves.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system, comprising:
  a plurality of wireless power transmitters configured to wirelessly transmit power, each wireless power transmitter being positioned at a different location and/or orientation, each wireless power transmitter being an active power source or a passive relay power source;
  at least one receiver, the at least one receiver being configured to receive the power wirelessly transmitted from at least one wireless power transmitter of the plurality of wireless power transmitters; and
  a master wireless power transmitter including processing circuitry configured to
    identify a position of a living being between any of the plurality of wireless power transmitters and the at least one receiver, and
    select at least one wireless power transmitter from the plurality of wireless power transmitters to transmit power wirelessly to the at least one receiver, the at least one wireless power transmitter being selected based on a wireless power transmitter that is closest to the at least one receiver without a living being positioned in a transmission path therebetween, and
    transmit information associated with the wireless power charging to the at least one receiver, wherein the information includes an optimal direction to position the at least one receiver to optimize power transfer.

2. The system of claim 1, further comprising:
a power harvester configured to receive relayed power wirelessly from the at least one receiver.

3. The system of claim 1, further comprising:
a proximity sensor configured to detect a location of the at least one receiver and obstacles between the at least one receiver and the plurality of wireless power transmitters.

4. The system of claim 3, wherein the proximity sensor is included in the at least one receiver.

5. The system of claim 3, wherein the proximity sensor is a camera.

6. The system of claim 3, wherein the proximity sensor is included in a wireless power transmitter of the plurality of wireless power transmitters.

7. The system of claim 1, wherein the at least one receiver is configured to:
detect a power level of a transmitted signal from the plurality of wireless power transmitters; and
broadcast a message to the plurality of wireless power transmitters indicating a requested change in the power level.

8. The system of claim 7, wherein the at least one receiver includes an envelope detector configured to detect the power level.

9. The system of claim 1, wherein the at least one receiver is selected from a plurality of receivers based on a priority level and a status of charge of each receiver.

10. The system of claim 1, wherein at least one wireless power transmitter is configured to:
output a message to the at least one receiver including charging instructions.

11. A method, comprising
identifying, by processing circuitry, a position of a living being between any of a plurality of wireless power transmitters and at least one receiver;
selecting, by the processing circuitry, one or more wireless power transmitters from the plurality of wireless power transmitters to transmit power wirelessly to the at least one receiver, the at least one wireless power transmitter being selected based on a wireless power transmitter that is closest to the at least one receiver without a living being positioned in a transmission path therebetween, each wireless power transmitter being positioned at a different location and/or orientation, each wireless power transmitter being an active power source or a passive relay power source configured to wirelessly transmit power;
transmitting information associated with the wireless power charging to the at least one receiver, wherein the information includes an optimal direction to position the at least one receiver to optimize power transfer; and
transmitting power wirelessly to the at least one receiver, the at least one receiver being configured to receive power wirelessly from the one or more wireless power transmitters of the plurality of wireless power transmitters.

12. The method of claim 11, further comprising:
determining a location of the at least one receiver and obstacles using a proximity sensor between the at least one receiver and the plurality of wireless power transmitters.

13. The method of claim 12, wherein the proximity sensor is a camera.

14. The method of claim 12, wherein the proximity sensor is included in a wireless power transmitter of the plurality of wireless power transmitters.

15. The method of claim 11, further comprising:
receiving a message from the at least one receiver indicating a requested change in the power level based on a detected power level of a transmitted signal from the plurality of wireless powder transmitters.

16. The method of claim 15, wherein the at least one receiver includes an envelope detector being configured to determine the powder level.

17. The method of claim 11, further comprising:
selecting the at least one receiver from a plurality of receivers based on a priority level and a status of charge of each receiver.

18. An apparatus, comprising:
communication circuitry; and
processing circuitry configured to
identify a position of a living being between any of a plurality of wireless power transmitters and at least one receiver,
select at least one wireless power transmitter from the plurality of wireless power transmitters to transmit power wirelessly to the at least one receiver, the at least one wireless power transmitter being selected based on a wireless power transmitter that is closest to the at least one receiver without a living being positioned in a transmission path therebetween,
transmit information associated with the wireless power charging to the at least one receiver wherein the information includes an optimal direction to position the at least one receiver to optimize power transfer, and
transmit power wirelessly to the at least one receiver.

19. The system of claim 1, wherein the processing circuitry is further configured to
identify the at least one receiver as a target device based on a time of day and date, and
transmit power to the target device for a predetermined amount of time before the target device is scheduled to leave a predefined area, wherein the amount of power transmitted to the target device during the predetermined amount of time is more than power transmitted at a time other than the predetermined amount of time.

* * * * *

UNITED STATES PATENT AND TRADEMARK OFFICE
CERTIFICATE OF CORRECTION

| | |
|---|---|
| PATENT NO. | : 11,025,099 B2 |
| APPLICATION NO. | : 16/000450 |
| DATED | : June 1, 2021 |
| INVENTOR(S) | : Murat Mese et al. |

It is certified that error appears in the above-identified patent and that said Letters Patent is hereby corrected as shown below:

In the Claims

Column 8, Line 55 (Claim 1): Remove "and";

Column 10, Line 17 (Claim 15): Replace "powder" with --power--;

Column 10, Line 20 (Claim 16): Replace "powder" with --power--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*